L. DODGE.
Draft-Equalizer for Horse-Powers.

No. 200,607. Patented Feb. 26, 1878.

Witnesses

Inventor
Levi Dodge
By Gridley & Sherburne
Attys

UNITED STATES PATENT OFFICE.

LEVI DODGE, OF EVANSTON, ILLINOIS, ASSIGNOR TO SALLY A. LEWIS, OF WATERFORD, NEW YORK.

IMPROVEMENT IN DRAFT-EQUALIZERS FOR HORSE-POWERS.

Specification forming part of Letters Patent No. 200,607, dated February 26, 1878; application filed October 25, 1877.

*To all whom it may concern:*

Be it known that I, LEVI DODGE, of Evanston, in the county of Cook and State of Illinois, have invented a new and useful Improvement in Draft-Equalizers for Horse-Powers; and I do hereby declare the following to be a full, clear, and exact description thereof, which will enable others skilled in the art to which my invention appertains to make and use the same, reference being had to the accompanying drawings, forming part of this specification, in which—

Figure 1:
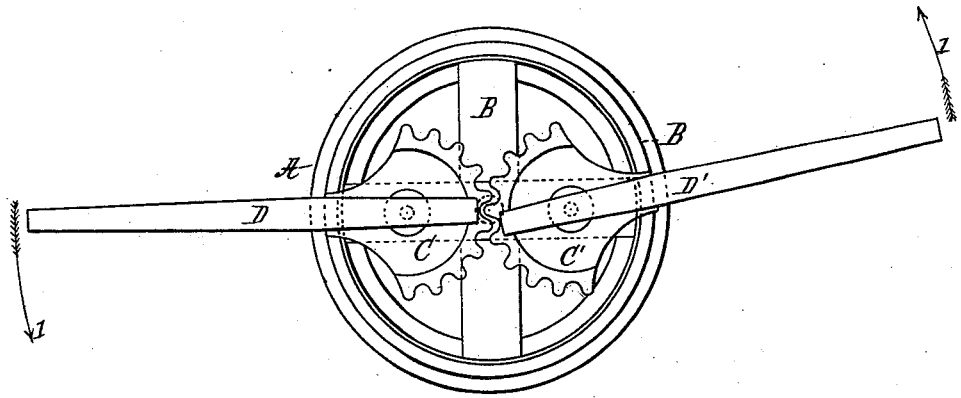
Figure 2:
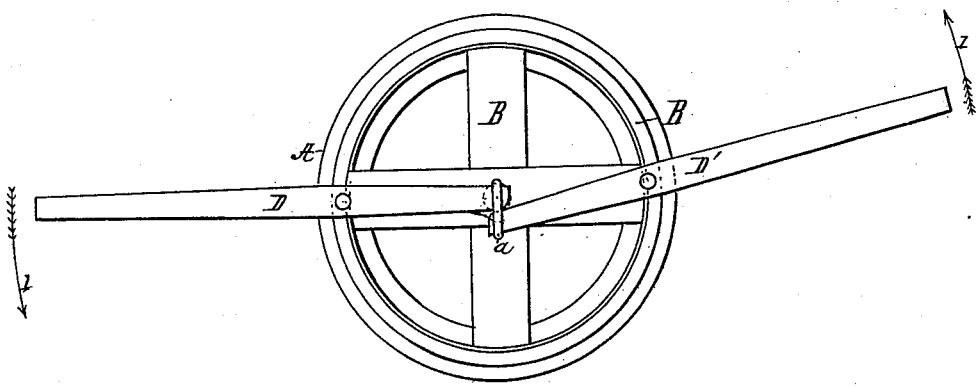

Figure 1 represents a top view of a horse-power with a draft-equalizer embodying my invention attached thereto; and Fig. 2 represents a like view, showing a modification of the means employed in connecting the inner or adjacent ends of the draft-levers.

Like letters of reference indicate like parts.

My invention relates to that class of equalizers used upon horse-powers in which draft-horses are employed; and my invention consists in pivoting the draft-levers to the main driving-wheel, and connecting the inner or adjacent ends of the levers together, so that when power is applied to the outer end of one of said levers to move the same forward with the draft, the force thus exerted will be communicated to the opposite lever, so as to move the outer end thereof backward against the draft, whereby the horses hitched to the opposite ends of the said levers are made to exert an equal amount of power thereon.

In the drawing, A represents the bed or frame-work of the machine, which may be made in any of the known forms; and B represents the main driving-wheel, which is journaled to the frame in the usual manner, and adjusted to engage with suitable intermediate gear-wheels (not shown) for increasing the velocity of the machinery to be operated, in the ordinary manner.

C and C' represent gear-quadrants, which are pivoted or journaled to the arms of the main driving-wheel B, or to the rim thereof, and so as to freely turn on their axes, and are so adjusted as to engage with each other, as shown in Fig. 1.

D and D' represent the draft-levers, which are made in the usual form, and are secured to the upper surface of the quadrants C and C', respectively, and so as to extend in opposite directions from the center of the main driving-wheel.

The arrangement of the quadrants and lever is such as to impart a rotary movement to the main driving-wheel when an equal amount of power is applied to the outer end of the lever, and so as to move them in the direction indicated by arrows 1; and by connecting the inner ends of the levers together by means of the quadrants, the power applied to one of said levers is communicated to the other, and thereby causes the horses hitched to the said levers to exert an equal amount of power thereon at all times.

I do not limit myself to the quadrants for connecting the inner or adjacent ends of the levers together.

Having thus described my invention, what I claim as new, and desire to secure by Letters Patent, is—

1. The combination, with the main driving-wheel B, of the draft-levers D and D', pivoted to the said wheel, and connected together at their inner or adjacent ends by means of a link, substantially as and for the purpose specified.

2. The combination, with the main driving-wheel B and draft-levers D and D', of the gear-quadrants C and C', substantially as and for the purpose specified.

LEVI DODGE.

Witnesses:
N. C. GRIDLEY,
N. H. SHERBURNE.